(12) United States Patent
Tsai et al.

(10) Patent No.: US 6,882,461 B1
(45) Date of Patent: Apr. 19, 2005

(54) MICRO ELECTRO MECHANICAL SYSTEM DISPLAY CELL AND METHOD FOR FABRICATING THEREOF

(75) Inventors: Hsiung-Kuang Tsai, Taipei (TW); Wen-Jian Lin, Hsinchu (TW)

(73) Assignee: Prime View International Co., Ltd, Hsinchu (TW)

( * ) Notice: Subject to any disclaimer, the term of this patent is extended or adjusted under 35 U.S.C. 154(b) by 0 days.

(21) Appl. No.: 10/812,257

(22) Filed: Mar. 29, 2004

(30) Foreign Application Priority Data

Feb. 18, 2004 (TW) ............................................ 93103981

(51) Int. Cl.⁷ ............................................... G02B 26/00
(52) U.S. Cl. ...................................................... 359/290
(58) Field of Search ................................. 359/290, 291, 359/292, 260; 438/24, 28, 52, 54, 66; 257/415, 678, 80, 82

(56) References Cited

U.S. PATENT DOCUMENTS 5,835,255 A   11/1998  Miles .......................... 359/291
6,448,709 B1 * 9/2002  Chuang et al. ............. 313/497

* cited by examiner

Primary Examiner—Hung Xuan Dang
Assistant Examiner—Tuyen Tra
(74) Attorney, Agent, or Firm—Thomas, Kayden, Horstemeyer & Risley

(57) ABSTRACT

A micro electro mechanical system display cell comprises a substrate, black matrix layer, a first electrode, a second electrode and supporters. The black matrix layer is located on the substrate and the first electrode is bridged between the black matrixes. The supporters are located on the black matrix layers and located between the two electrodes. The black matrix layers are used to prevent the light leakage between the second electrodes and between the first electrode and the second electrode.

27 Claims, 4 Drawing Sheets

MICRO ELECTRO MECHANICAL SYSTEM DISPLAY CELL AND METHOD FOR FABRICATING THEREOF

FIELD OF INVENTION

The present invention relates to a micro electro mechanical system display panel, and more particularly, the present invention relates to a micro electro mechanical system display panel using a mode of optical interference display.

BACKGROUND OF THE INVENTION

Planar displays have great superiority in the portable display device and limited-space display market because they are lightweight and small. To date, in addition to liquid crystal displays (LCD), organic electro-luminescent displays (OLED), and plasma display panels (PDP), a mode of optical interference display is another option for planar displays.

U.S. Pat. No. 5,835,255 discloses an array of optical interference display cells of visible light that can be used as a planar display. Referring to FIG. 1, FIG. 1 illustrates a cross-sectional view of a conventional optical interference microelectromechanical display cell 108. Every optical interference display cell 108 comprises a cavity 110 formed therebetween a first electrode 102 and a second electrode 104 that are supported by supporters 106. The distance between the first electrode 102 and the second electrode 104, that is, the length of the cavity 110, is D. Either the first electrode 102 or the second electrode 104 is a semi-transmissible/semi-reflective layer with an absorption rate that partially absorbs visible light, and the other is a light reflective layer that is deformable when voltage is applied. When the incident light passes through the first electrode 102 or the second electrode 104 and into the cavity 110, in wavelengths (λ) of all visible light spectra of the incident light, only visible light with a wavelength λ1 corresponding to formula 1.1 can generate a constructive interference and can be emitted, that is, $$2D = N\lambda \qquad (1.1)$$

where N is a natural number.

When the length D of the cavity 110 is equal to half of the wavelength multiplied by any natural number, a constructive interference is generated and a sharp light wave is emitted. In the meantime, if an observer follows the direction of the incident light, a reflected light with wavelength $\lambda_1$ can be observed. Therefore, the optical interference display cell 100 is in the "open" status.

Referring to FIG. 2, FIG. 2 illustrates a cross-sectional view of the optical interference microelectromechanical display cell of FIG. 1 that is "closed". The second electrode 104 is a deformable electrode that falls down while driven by the voltage. At this time, the length of the cavity 110 is changed. The reflected light after interference is either absorbed or becomes invisible light. An observer who follows the direction of the incident light cannot observe any reflected light in the visible light spectrum. Therefore, the display cell 108 is now "closed". When the second electrode 104 falls down, an observer is supposed to observe a black display cell since, theoretically, the whole display cell is in the "closed" status. However, since the supporter 106 is transparent, incident light still can be reflected from the bottom surface 116 of the supporter. Furthermore, the cavity 110 in area 114 still has a considerable length allowing reflected visible light to emit therefrom since the second electrode 104 cannot stay close to the supporter 106. Therefore, even if the display cell 108 is in the "closed" status, the display cell 108 is not completely black since light still leaks from the bottom surface 116 of the supporter 106 and area 114.

SUMMARY OF THE INVENTION

Accordingly, an objective of the present invention is to provide a micro electro mechanical system display cell using a mode of optical interference display that can prevent light leakage when the display cell is in the "closed" status.

Another objective of the present invention is to provide a micro electro mechanical system display cell using a mode of optical interference display that is provided with a black matrix layer under the supporters to prevent occurrence of light leakage when the display cell is in the "closed" status.

Still another objective of the present invention is to provide a micro electro mechanical system display cell using a mode of optical interference display that utilized a black matrix layer provided under the supporters to prevent occurrence of light leakage when the display cell is in the "closed" status thereby obtaining a micro electro mechanical system display panel of high quality.

According to the aforementioned objectives of the present invention, the present invention provides a micro electro mechanical system display cell at least comprising a substrate, black matrix layers, a first electrode, a second electrode and supporters wherein the black matrix layers are formed on the substrate. A planarization layer is formed between the black matrix layers. The supporter is disposed on the black matrix layer; the first electrode is disposed on the planarization layer and the black matrix layer; and every first electrode is located between two supporters. The first electrode and the second electrode are supported by the supporters, and a cavity is subsequently formed therebetween. The black matrix layer is located under the supporters thereby shielding the light leakage due to the supporters located under the second electrode. The black matrix layer may extend from the location under the supporters to peripheral area appropriately thereby preventing the light leakage between the second electrodes and between the first electrode and the second electrode. The planarization layer was used for preventing the height difference between the black matrix layer and the substrate form resulting in light leakage.

The outwardly extending length of the black matrix layer depends on the design of the micro electro mechanical system display cell, since the size of the display cell, the length of the cavity, the stress of the second electrode and the width of the supporters affect the size of the light leakage area around the supporters when the display cell is in the "closed" status. Typically, the outwardly extending length of the black matrix layer is in the range of 0 to 50 micrometers (preferably 0 to 10 micrometers). The material of the black matrix layer can be chromium metal, chromium oxide, chromium metal/chromium oxide composite film or black resin. The thickness of the black matrix layer is 1000–5000 angstroms (preferably 2000–3000 angstroms) so as to shield the light leakage efficiently. A black matrix layer of black resin must be thicker than a chromium metal black matrix layer.

According to the aforementioned objectives of the present invention, one preferred embodiment of the present invention provides a method for fabricating a micro electro mechanical system display cell. In this method, black matrix layers and a planarization layer are formed on a transparent substrate in sequence. Every black matrix is located between two planarization layers and is substantially level with the planarization layer. Next, a first electrode and a sacrificial layer are formed on the black matrix layer and the planarization layer in sequence, and openings are formed in the first electrode and the sacrificial layer wherein each of the openings is suitable for forming a supporter therein and exposes a portion of the black matrix layer. Then, a first photoresist layer is spin-coated on the sacrificial layer to fill up the openings. The photoresist layer is patterned by a photolithography process to define the supporters.

After the supporters are formed, a second electrode is formed on the sacrificial layer and the supporters. Finally, the sacrificial layer is removed by a structure release etching process thereby obtaining a micro electro mechanical system display cell having a black matrix layer to prevent occurrence of light leakage when the display cell is in the "closed" status.

The micro electro mechanical system display cell formed by the aforementioned process is provided with a black matrix layer under the supporters to shield light leaking from the bottom surface of the supporter and peripheral area when the display cell is in the "closed" status. Therefore, the present invention can provide a micro electro mechanical system display cell with a high resolution according to the method and the structure disclosed above.

BRIEF DESCRIPTION OF THE DRAWINGS

These and other features, aspects, and advantages of the present invention will be more fully understood by reading the following detailed description of the preferred embodiment, with reference made to the accompanying drawings as follows.

DETAILED DESCRIPTION OF THE PREFERRED EMBODIMENT

In order to make the illustration of the micro electro mechanical system display cell provided in the present invention more clear, the manufacturing method of every micro electro mechanical system display cell is set forth in the detailed description of the preferred embodiment.

EXAMPLE

Figure 1:
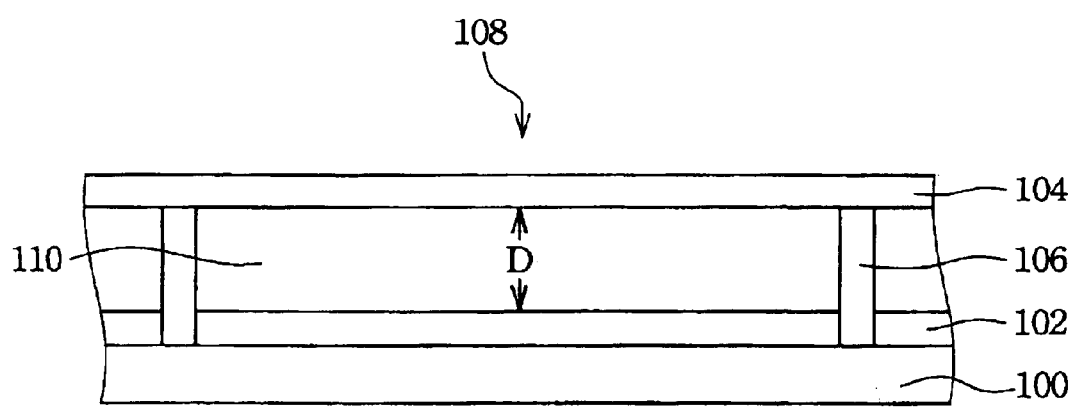
FIG. 1 illustrates a cross-sectional view of a conventional optical interference microelectromechanical display cell.
Figure 2:
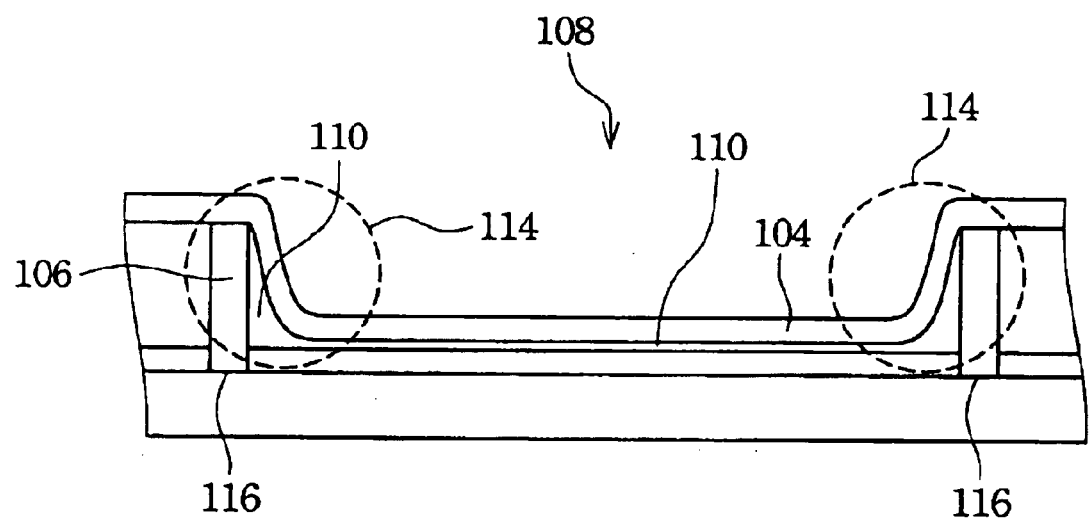
FIG. 2 illustrates a cross-sectional view of an optical interference microelectromechanical display cell of FIG. 1 in the "closed" status.
Figure 3A:
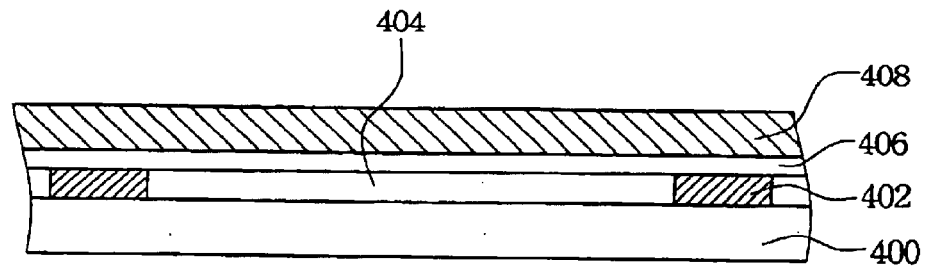
FIG. 3A to FIG. 3C illustrate a method for manufacturing an optical interference display cell in accordance with a preferred embodiment of the present invention.
Figure 3B:
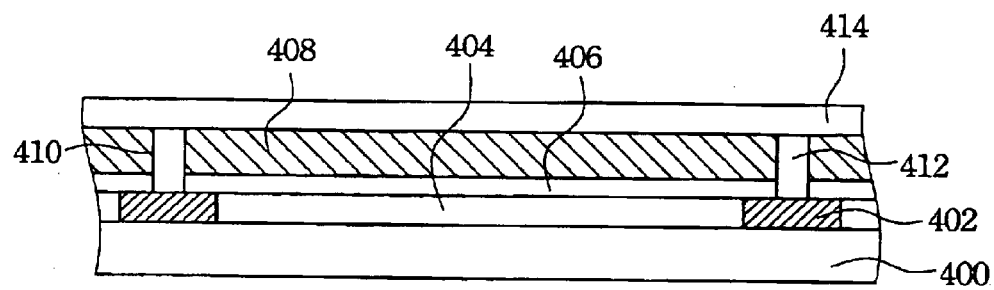
Figure 3C:
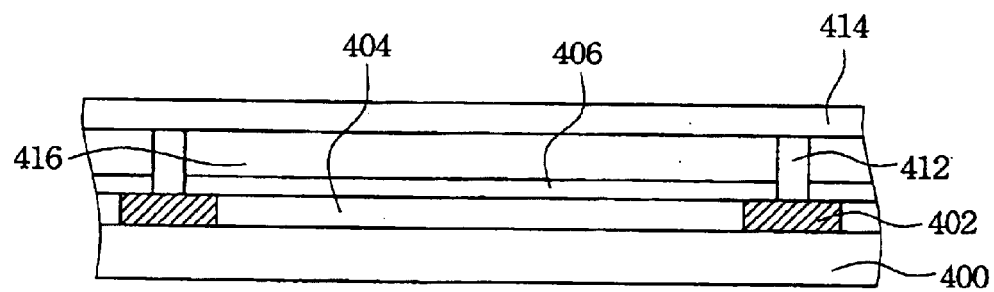

FIG. 3A to FIG. 3C illustrate a method for manufacturing an micro electro mechanical system display cell in accordance with a preferred embodiment of the present invention. Referring to FIG. 3A, a black matrix layer 402 and a planarization layer 404 are formed on a transparent substrate 400 in advance. The black matrix layer 402 can be formed before or after the planarization layer 404 is formed. In the embodiment, the transparent substrate 400 can be a glass substrate, and the black matrix layer is formed form a chromium metal/chromium oxide composite film with a thickness of 2000–3000 angstroms. Material used for forming the planarization layer 404 can be insulating material, e.g., dielectric material such as silicon oxide or silicon nitride, or photosensitive organic resin, such as epoxy, polyacrylic, polyimide or polyamide. The thickness of the planarization layer 404 is substantially equal to or smaller than that of the black matrix layer 402. The process for forming the black matrix layer 402 is described as follows. After a light shielding material layer is formed on the transparent substrate 400 by electroplating or vapor deposition, the light shielding material layer is patterned by a photolithographic etching process to form the black matrix layer 402. Then, a dielectric material such as silicon oxide or silicon nitride is deposited over the black matrix layer 402 by vapor deposition, and the dielectric material located above the black matrix layer 402 is removed to form the planarization layer 404.

Next, a first electrode 406 and a sacrificial layer 408 are formed in sequence wherein the first electrode 406 at least includes a transparent conductive layer made of material such as indium tin oxide (ITO), indium-doped zinc oxide (IZO), zinc oxide (ZO), indium oxide (IO), and so on. The sacrificial layer 408 may be made of transparent material such as dielectric material, or opaque material such as metal material.

Referring to FIG. 3B, openings 410 are formed in the first electrode 406 and the sacrificial layer 408 by a photolithographic etching process, and each of the openings 410 suitable for forming a supporter therein. Then, a material layer is formed on the sacrificial layer 408 and fills up the openings 410. The material layer is suitable for forming the supporter, the material layer generally is made of photosensitive materials such as positive photoresist or negative photoresist, or non-photosensitive polymer materials such as polyester, polyamide, acrylic resin, epoxy resin, etc. If non-photosensitive materials are used for forming the material layer, a photolithographic etching process is required to define supporters in the material layer. In this embodiment, the photosensitive materials are used for forming the material layer, so merely a photolithography process is required for patterning the material layer. The material layer is patterned by a photolithography process to define the supporters 412. Next, a second electrode 414 is formed on the sacrificial layer 408 and the supporters 412. The material of the second electrode 414 is conductive materials such as silver, aluminum, chromium, copper, cobalt, and so on.

Referring to FIG. 3C, the sacrificial layer 408 shown in FIG. 3C is removed by a structure release etching process to form a cavity 416 between the first electrode 406 and the second electrode 414 thereby completing the manufacture of the micro electro mechanical system display cell 418.

Figure 4:
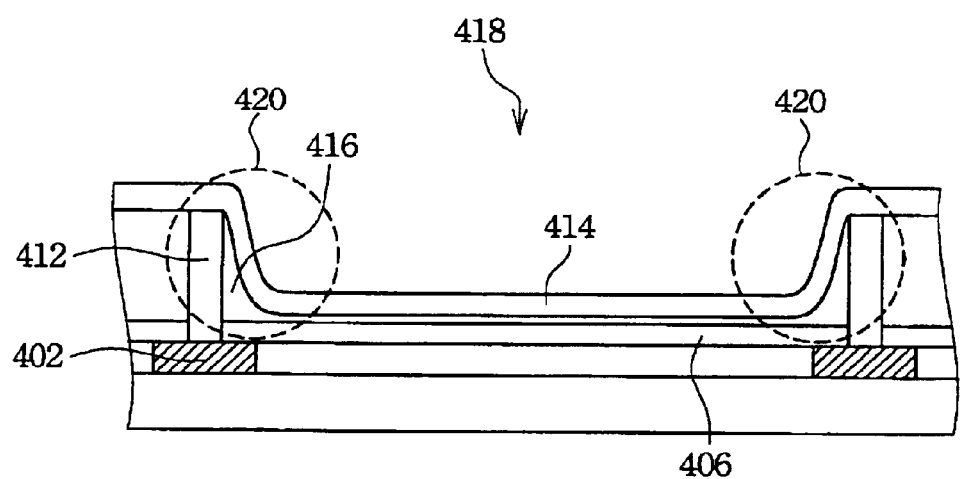
FIG. 4 illustrates a cross-sectional view of an optical interference microelectromechanical display cell of FIG. 3C in the "closed" status.

Referring to FIG. 4, FIG. 4 illustrates the optical interference micro electro mechanical system display cell 418 of FIG. 3C in the "closed" status. The micro electro mechanical system display cell 418 is in the "closed" status. Although the supporters 412 are transparent, the black matrix layer 402 is located under the supporters 412. Incident light reflected therefrom will be absorbed by the black matrix layer 402 rather than reflected from the bottom surface of the supporters 412.

Moreover, after the second electrode 414 falls down, although the second electrode 414 cannot stay close to the supporter 412 such that the cavity 416 in area 420 still has a considerable length, incident light reflected from the second electrode 414 will be absorbed by the black matrix layer 402 rather than emitted through the first electrode 406. Therefore, the light leakage of the micro electro mechanical system display cell 418 in the "closed" status is substantially improved thereby increasing the resolution of the micro electro mechanical system display cell 418.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structure.

What is claimed is:

1. A micro electro mechanical system display cell comprising:
   a transparent substrate;
   two black matrix layers on the transparent substrate;
   two supporters respectively disposed on the black matrix layers wherein each of the supporters has a width smaller than the width of each of the black matrix layers;
   a first electrode formed between the supporters and on the black matrix layers; and
   a second electrode supported by the supporters wherein a cavity is formed between the first electrode and the second electrode.

2. The micro electro mechanical system display cell according to claim 1, further comprising a planarization layer formed between the black matrix layers and under the first electrode.

3. The micro electro mechanical system display cell according to claim 2, wherein the thickness of the planarization layer is substantially equal to or smaller than the thickness of the black matrix layers.

4. The micro electro mechanical system display cell according to claim 2, wherein the material of planarization layer is insulating material or dielectric material.

5. The micro electro mechanical system display cell according to claim 2, wherein the material of planarization layer is an insulation material.

6. The micro electro mechanical system display cell according to claim 2, wherein a material for forming the planarization layer is dielectric.

7. The micro electro mechanical system display cell according to claim 2, wherein a material for forming the planarization layer is photosensitive organic resin, silicon oxide or silicon nitride.

8. The micro electro mechanical system display cell according to claim 7, wherein the photosensitive organic resin is epoxy, polyacrylic, polyimide or polyamide.

9. The micro electro mechanical system display cell according to claim 1, wherein each of the black matrix layers is 0–50 micrometers wider than each of the supporters.

10. The micro electro mechanical system display cell according to claim 1, wherein each of the black matrix layers is 0–10 micrometers wider than each of the supporters.

11. The micro electro mechanical system display cell according to claim 1, wherein the material of the black matrix layer is chromium metal, chromium oxide or chromium metal/chromium oxide composite material.

12. The micro electro mechanical system display cell according to claim 1, wherein the material of the first electrode is indium tin oxide, indium-doped zinc oxide or indium oxide.

13. The micro electro mechanical system display cell according to claim 1, wherein the second electrode is an electrode capable of being deformed upwards or downwards.

14. The micro electro mechanical system display cell according to claim 1, wherein the material of the second electrode is selected from the group consisting of silver, aluminum, chromium, copper and cobalt.

15. The micro electro mechanical system display cell according to claim 1, wherein the material of the supporters is selected from the group consisting of positive photoresist, negative photoresist, acrylic resin and epoxy resin.

16. A method for fabricating a micro electro mechanical system display cell on a transparent substrate, the method at least comprising:
   forming two black matrix layers and a planarization layer wherein the black matrix layers and the planarization layer are arranged alternately,
   forming a first electrode on the black matrix layers and the planarization layer;
   forming a sacrificial layer on the first electrode;
   forming at least two openings in the first electrode and the sacrificial layer;
   forming a supporter in each of the openings;
   forming a second electrode is on the sacrificial layer and the supporters; and
   removing the sacrificial layer.

17. The method for fabricating a micro electro mechanical system display cell according to claim 16, wherein the second electrode is an electrode capable of being deformed upwards or downwards.

18. The method for fabricating a micro electro mechanical system display cell according to claim 16, wherein the thickness of the planarization layer is substantially equal to the thickness of the black matrix layers.

19. The method for fabricating a micro electro mechanical system display cell according to claim 16, wherein the thickness of the planarization layer is smaller than the thickness of the black matrix layers.

20. The method for fabricating a micro electro mechanical system display cell according to claim 16, wherein the material of planarization layer is insulating material.

21. The method for fabricating a micro electro mechanical system display cell according to claim 16, wherein the material of planarization layer is dielectric material.

22. The method for fabricating a micro electro mechanical system display cell according to claim 16, wherein the material of planarization layer is photosensitive organic resin, silicon oxide or silicon nitride.

23. The method for fabricating a micro electro mechanical system display cell according to claim 22, wherein the photosensitive organic resin is epoxy, polyacrylic, polyimide or polyamide.

24. The method for fabricating a micro electro mechanical system display cell according to claim 16, wherein each of the black matrix layers is 0–50 micrometers wider than each of the supporters.

25. The method for fabricating-a micro electro mechanical system display cell according to claim 16, wherein each of the black matrix layers is 0–10 micrometers wider than each of the supporters.

26. The method for fabricating a micro electro mechanical system display cell according to claim 16, wherein the material of the second electrode is selected from the group consisting of silver, aluminum, chromium, copper and cobalt.

27. The micro electro mechanical system display cell according to claim 16, wherein the material of the supporters is selected from the group consisting of positive photoresist, negative photoresist, acrylic resin and epoxy resin.

* * * * *